J. J. Sawyer,
Dish Cleaner,
No. 58,895.
Patented Oct. 16, 1866.
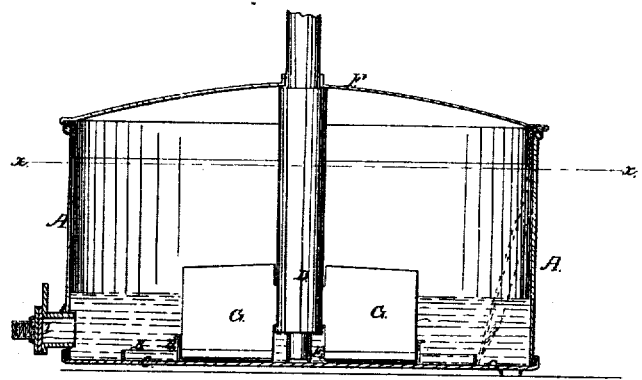
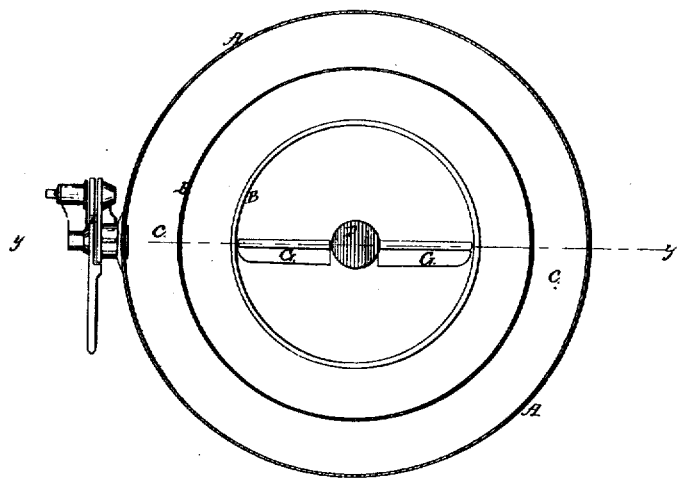
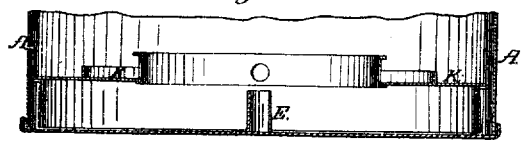
Witnesses
Inventor

UNITED STATES PATENT OFFICE.

JAMES J. SAWYER, OF WOODSTOCK, CONNECTICUT.

IMPROVED DISH-WASHER.

Specification forming part of Letters Patent No. 58,895, dated October 16, 1866.

*To all whom it may concern:*

Be it known that I, JAMES J. SAWYER, of Woodstock, in the county of Windham and State of Connecticut, have invented a new and Improved Machine or Apparatus for the Washing or Cleansing of Dishes and other Articles and Wares; and I do hereby declare that the following is a full, clear, and exact description thereof, which will enable others skilled in the art to make and use the same, reference being had to the accompanying drawings, forming part of this specification, in which—

Figure 1 is a horizontal section of the machine, taken in the plane of the line $x\ x$, Fig. 2; Fig. 2, a vertical section taken in the plane of the line $y\ y$, Fig. 1; and Fig. 3, a vertical section similar to Fig. 2, showing a modification in the machine.

Similar letters of reference indicate like parts.

The machine or apparatus for cleansing dishes and other articles or wares embraced in the present invention consists of a reservoir or receptacle for the water or other cleansing or washing liquid to be used, which reservoir is so formed as to receive and hold the dishes along and around its edges or sides, leaving the central portion free or clear, in which, by any suitable means, a dasher or beater is revolved or otherwise properly manipulated to throw and dash the water or other cleansing-liquid employed about and over the dishes contained in the reservoir, as will be apparent from the following detail description of the machine, the water and dish receptacle being provided with a cover for preventing the water or cleansing-liquid used from being thrown out of the receptacle as it is caused to be dashed about and around the interior of the same.

A in the drawings represents a receptacle, reservoir, or basin, which, in the present instance, is made of a round shape, but may be made of other and various forms—such as, for instance, square, rectangular, polygonal, or oval, &c. In this receptacle the dishes or other articles or wares to be cleansed or washed are placed, suitable raised flanges or lips B being formed around and upon its bottom plate, C, for them to rest against, so that the central portion of the vessel will be left entirely free and clear, the position of the dishes being illustrated in Fig. 2. D, a shaft or spindle, turning at its lower end in a suitable thimble or tube, E, fastened to the center of the bottom plate, and passing up through the center of the cover F to the vessel or receptacle, on which shaft, within the vessel, radial floats or wings G G are secured, that, as the shaft is revolved, either with a continuous or reciprocating motion, in any proper manner, by means of a winch-handle or otherwise, act upon the water or other cleansing or washing liquid with which the vessel is filled, or partially so, and thereby cause it to be thrown or dashed about within the vessel and over the dishes arranged in it, the size of the said floats G being such that as they are revolved they will not strike the dishes in the vessel. The water or other cleansing-liquid having thus been dashed and thrown over the dishes to be washed a sufficient length of time to have thoroughly cleansed them, the water is then drawn off through a stop-cock, I, suitably arranged and connected with the receptacle therefor, and the cover being lifted from the vessel, the dishes are then removed therefrom and wiped with a towel or other suitable means, when more dishes being placed in the vessel, as before described, and it again filled, or partially so, with water or other suitable liquid, they may also be cleansed or washed, and so on as long as may be desired, it being here remarked that the same water or other cleansing-liquid may be used for several series or batches of dishes, whether one or more, if so desired.

In lieu of forming the bottom of the vessel with the raised flanges, as above explained, it may be left perfectly clear and free, so as to allow the vessel to be used for other purposes, a false bottom, K, such as represented in Fig. 3, being then employed within the vessel, which bottom is to be susceptible of being inserted in and removed from the vessel, according as may be desired; and, furthermore, in lieu of arranging the dasher or beater for the water or liquid so as to revolve in a fixed plane, it may be arranged so as not only to revolve, but be susceptible of being moved in a lateral or rectilinear direction through the water or liquid, which, in elongated vessels, would be the most practical, in order to throw the water over all the dishes in the vessel, and therefore I do not intend to limit myself to any one particular arrangement thereof.

Among the many advantages of my improved machine or apparatus for washing dishes more especially, although it can be applied to other articles, may be here mentioned as the most important that, first, it enables water heated to a high degree of heat to be used—a quite important feature; second, that it is exceedingly simple, cheap, and very effective in operation, as well as convenient and desirable for use in families, hotels, or other places, much labor and trouble being necessarily economized by it.

I claim as new and desire to secure by Letters Patent—

1. The resting-lips B on the bottom plate, C, of the receptacle A, arranged to operate with the floats G therein, as described, for the purpose specified.

2. The removable false bottom K, in combination with the receptacle A, as described, for the purpose specified.

The above specification of my invention signed by me this 3d day of May, 1866.

JAMES J. SAWYER.

Witnesses:
M. M. LIVINGSTON,
ALBERT W. BROWN.